(12) United States Patent
Saito et al.

(10) Patent No.: US 12,537,841 B2
(45) Date of Patent: Jan. 27, 2026

(54) ABNORMALITY DETERMINATION APPARATUS, MOBILE OBJECT, ABNORMALITY DETERMINATION METHOD, AND COMPUTER-READABLE STORAGE MEDIUM

(71) Applicant: HONDA MOTOR CO.,LTD., Tokyo (JP)

(72) Inventors: Daisuke Saito, Tokyo (JP); Yuki Hirono, Tokyo (JP)

(73) Assignee: HONDA MOTOR CO., LTD., Tokyo (JP)

( * ) Notice: Subject to any disclaimer, the term of this patent is extended or adjusted under 35 U.S.C. 154(b) by 175 days.

(21) Appl. No.: 18/458,167

(22) Filed: Aug. 30, 2023

(65) Prior Publication Data

US 2024/0080331 A1 Mar. 7, 2024

(30) Foreign Application Priority Data

Sep. 5, 2022 (JP) .................................. 2022-141048

(51) Int. Cl.
*H04L 9/40* (2022.01)
(52) U.S. Cl.
CPC ...... *H04L 63/1425* (2013.01); *H04L 63/1408* (2013.01); *H04L 63/1416* (2013.01)
(58) Field of Classification Search
CPC ............... H04L 27/144; H04L 63/1408; H04L 63/1425
See application file for complete search history.

(56) References Cited

U.S. PATENT DOCUMENTS

| | | | |
|---|---|---|---|
| 4,015,206 A * | 3/1977 | Huntley | H04L 27/144 340/13.33 |
| 2018/0115575 A1 | 4/2018 | Hartkopp | |
| 2019/0028509 A1* | 1/2019 | Cidon | H04L 63/1425 |
| 2020/0099707 A1* | 3/2020 | Abbaszadeh | G06N 20/00 |
| 2021/0149387 A1* | 5/2021 | Lee | G05B 23/0213 |
| 2021/0273956 A1 | 9/2021 | Nishimoto | |
| 2021/0320932 A1 | 10/2021 | Tsurumi | |

(Continued)

FOREIGN PATENT DOCUMENTS

| | | |
|---|---|---|
| JP | 2020092325 A | 6/2020 |
| JP | 2021136631 A | 9/2021 |

(Continued)

OTHER PUBLICATIONS

Office Action issued for counterpart Japanese Application No. 2022-141048, transmitted from the Japanese Patent Office on Jul. 15, 2025 (drafted on Jul. 9, 2025).

*Primary Examiner* — Barbara B Anyan

(57) ABSTRACT

An abnormality determination apparatus that includes: a judgement unit which judges, based on detection timings of multiple signals in the communication network, whether each of the multiple signals is either a normal signal or an abnormal signal; and a determination unit which determines, if there is detected a signal judged as the abnormal signal, a type of abnormality having occurred in the communication network based on distribution of detection timings of multiple signals detected at a timing at which the signal judged as the abnormal signal is detected in the communication network or later. Here, each of the multiple signals is judged as the normal signal or the abnormal signal.

18 Claims, 13 Drawing Sheets

(56) References Cited

U.S. PATENT DOCUMENTS

2021/0392109 A1    12/2021  Hamada
2022/0327204 A1*   10/2022  Abbaszadeh ....... H04L 63/1408
2023/0083078 A1*    3/2023  Chen ................. H02J 13/00002
                                                          702/59

FOREIGN PATENT DOCUMENTS

WO         2020079874  A1     4/2020
WO         2020137743  A1     7/2020

* cited by examiner

ABNORMALITY DETERMINATION APPARATUS, MOBILE OBJECT, ABNORMALITY DETERMINATION METHOD, AND COMPUTER-READABLE STORAGE MEDIUM

The contents of the following Japanese patent application(s) are incorporated herein by reference:
NO. 2022-141048 filed in JP on Sep. 5, 2022.

BACKGROUND

1. Technical Field

The present invention relates to an abnormality determination apparatus, a mobile object, an abnormality determination method, and a computer-readable storage medium.

2. Related Art

Patent Document 1 discloses a technique of judging whether an attack against a communication network has occurred.

PRIOR ART DOCUMENT

Patent Document 1: Japanese Patent Application Publication No. 2020-92325

DESCRIPTION OF EXEMPLARY EMBODIMENTS

Hereinafter, embodiments of the present invention will be explained, but the following embodiments do not limit the invention according to the claims. In addition, not all of the combinations of features explained in the embodiments are essential to the solution of the invention.

Figure 1:
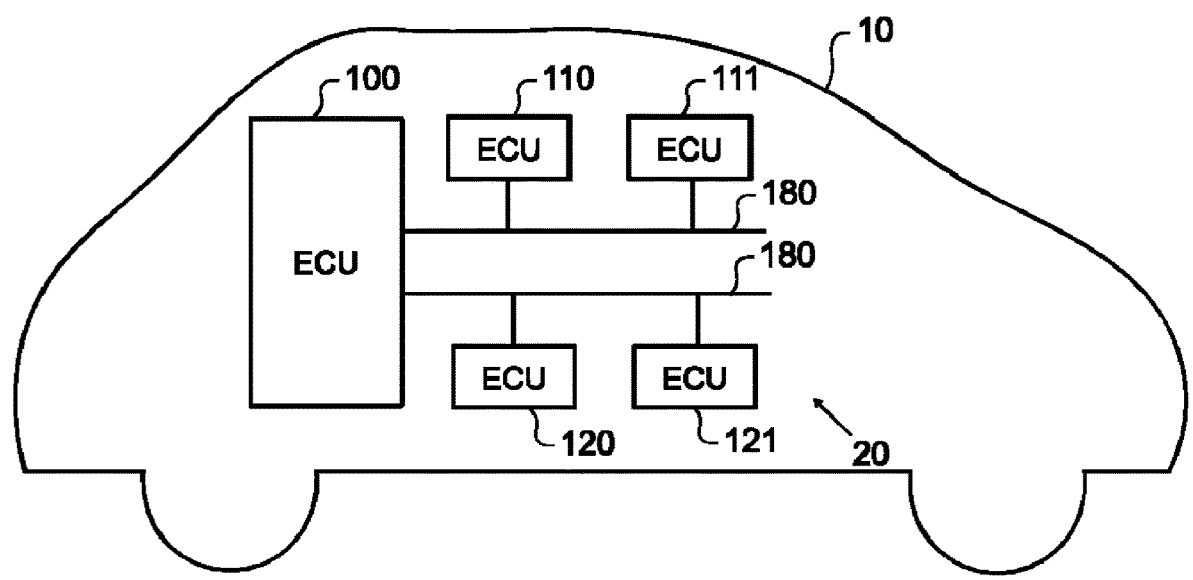
FIG. 1 conceptually illustrates a system configuration of a mobile object 10 in one embodiment.

FIG. 1 conceptually illustrates a system configuration of a mobile object 10 in one embodiment. In the present embodiment, the mobile object 10 is a vehicle. The mobile object 10 includes a system 20. The system 20 includes a plurality of electronic control units (ECUs) including an ECU 100, an ECU 110, an ECU 111, an ECU 120, and an ECU 121. The ECUs included in the mobile object 10 include an ECU for controlling equipment that has a direct impact on driving of the mobile object 10, such as an engine, a transmission, or a steering gear. The ECUs included in the mobile object 10 include an ECU for controlling equipment that has no direct impact on driving of the mobile object 10, such as an air-conditioner or a navigation system. The ECUs 100, 110, 111, 120, and 121 are examples of in-vehicle equipment.

The ECUs included in the mobile object 10 mutually communicate through controller area network (CAN) communication. Each ECU included in the mobile object 10 is communicably connected to other ECUs by a plurality of communication networks 180. The ECU 100 functions as a gateway that relays communication among the plurality of communication networks 180.

The communication network 180 is a communication network to which signals are expected to be input at predetermined time intervals. In the present embodiment, the communication network 180 is a communication network compliant with the CAN standard. The communication network 180 is an example of a communication network.

Figure 2:
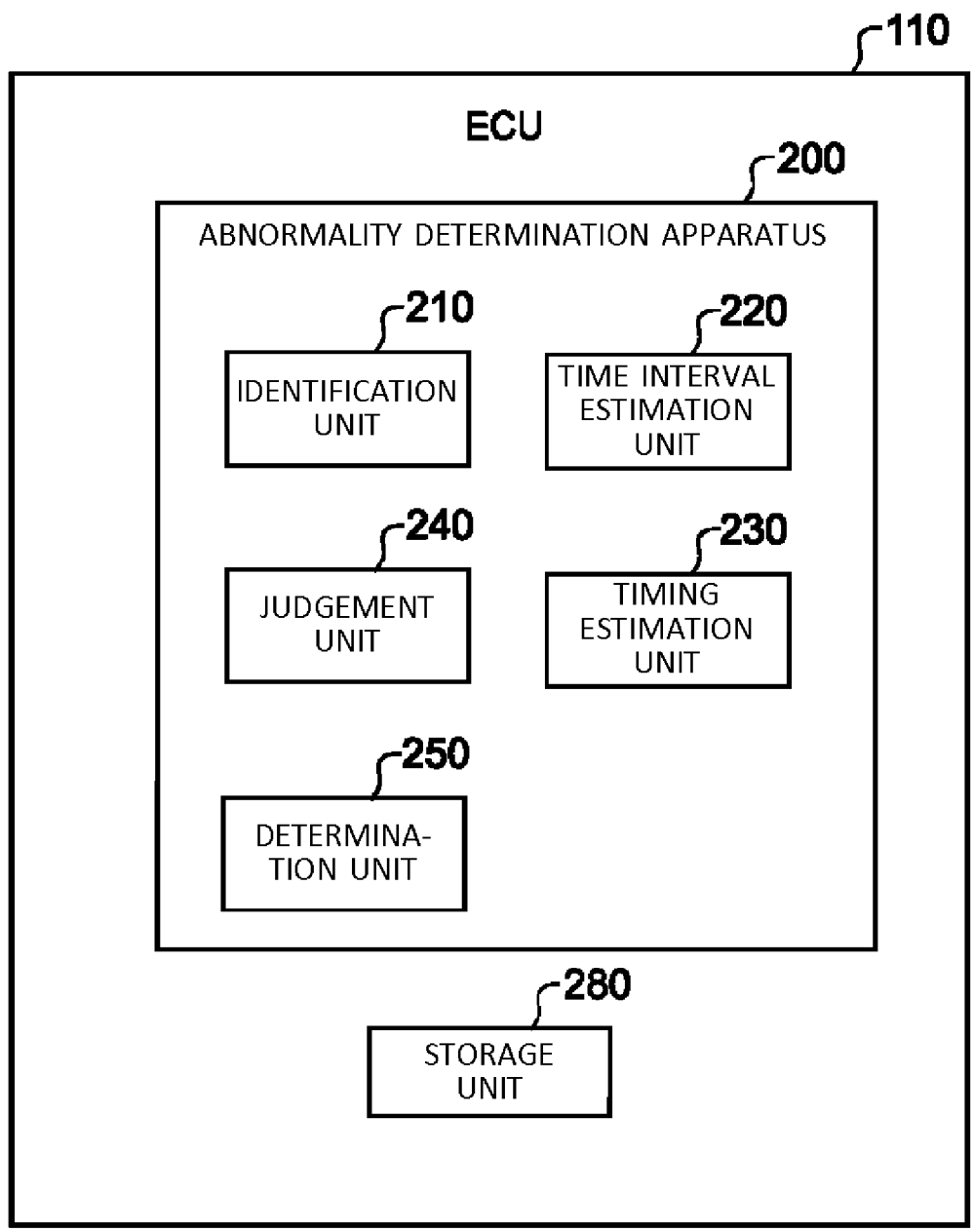
FIG. 2 is a block diagram that schematically illustrates a functional configuration included in an ECU 110.

FIG. 2 is a block diagram that schematically illustrates a functional configuration included in the ECU 110. The ECU 110 includes an abnormality determination apparatus 200, and a storage unit 280. The ECU 110 has a function of judging whether a signal input to the communication network 180 is a normal signal or an abnormal signal. The ECU 110 further has a function of determining a type of abnormality having occurred in the communication network 180.

In the present embodiment, the abnormal signal may be an unauthorized signal that is input when a third party attacks against the communication network 180. Examples of the attacks against the communication network 180 can include an impersonation attack, a DoS attack, and the like. The abnormal signal may be a non-normal signal that an ECU other than the ECU 110 irregularly inputs to the communication network 180.

The abnormality determination apparatus 200 may be implemented by a processor that performs computation processing, such as a CPU. The storage unit 280 may include a nonvolatile storage medium such as a flash memory, and a volatile storage medium such as a random access memory. The ECU 110 may be configured to include a computer. The ECU 110 executes various controls by having the abnormality determination apparatus 200 operate according to a program stored in the nonvolatile storage medium.

The abnormality determination apparatus 200 includes an identification unit 210, a time interval estimation unit 220, a timing estimation unit 230, a judgement unit 240, and a determination unit 250.

The judgement unit 240 judges whether each of the multiple signals is either a normal signal or an abnormal signal, based on detection timings of multiple signals in the communication network 180. The determination unit 250 determines, if there is detected a signal judged as the abnormal signal, a type of abnormality having occurred in the communication network 180 based on distribution of detection timings of multiple signals detected at a timing at which the signal judged as the abnormal signal is detected in the communication network 180 or later. Here, each of the multiple signals is a signal judged as the normal signal or abnormal signal. The distribution of detection timings may be expressed with, for example, indicators of densities, time intervals, sequences, orders, regularity, variations, patterns, and the number of the detection timings.

The determination unit 250 may determine a type of attack performed by inputting an unauthorized signal to the communication network 180, based on a sequence of the detection timings of the multiple signals each judged as the normal signal or abnormal signal.

The determination unit 250 may determine that an attack has been performed on the communication network 180, if there is regularity in the detection timings of the multiple signals each judged as the abnormal signal, based on a sequence of the detection timings of the multiple signals each judged as the normal signal or abnormal signal.

The determination unit 250 may determine that an impersonation attack has been performed on the communication network 180, if it is determined that the multiple signals each judged as the abnormal signal, are detected within a predetermined time range from detection of the multiple signals each judged as the normal signal, based on the sequence of detection timings. For example, the determination unit 250 may determine that an impersonation attack has been performed on the communication network 180, if it is determined that the multiple signals each judged as the abnormal signal, are detected within a predetermined time range prior to detection timings of the multiple signals each judged as the normal signal, based on the sequence of detection timings. The determination unit 250 may determine that an impersonation attack has been performed on the communication network 180, if it is determined that the multiple signals each judged as the abnormal signal, are detected within a predetermined time range later than detection timings of the multiple signals each judged as the normal signal, based on the sequence of detection timings. The determination unit 250 may determine that an impersonation attack has been performed on the communication network 180, if it is determined that the multiple signals each judged as the abnormal signal, are detected within a predetermined time range before and after detection timings of the multiple signals each judged as the normal signal, based on the sequence of detection timings.

The determination unit 250 may determine that, if the number of detected signals each judged as the abnormal signal, exceeds a predetermined number between detection timings of successive signals each judged as the normal signal, a DoS attack has been performed on the communication network 180.

The determination unit 250 may determine that abnormality has occurred in equipment connected to the communication network 180, if regularity in detection timings of the multiple signals each judged as the abnormal signal, is lower than a predetermined value, based on the sequence of detection timings.

The identification unit 210 identifies a reference signal that serves as reference for identifying an abnormal signal from multiple signals detected in the communication network 180. The timing estimation unit 230 estimates timings at which multiple signals will be detected in the communication network 180 later than the reference signal, based on a detection timing of the reference signal and time intervals over which the multiple signals are input to the communication network 180.

Specifically, the time interval estimation unit 220 estimates a time interval of signals to be successively input to the communication network 180, based on detection timings of multiple signals detected in the communication network 180. For example, the time interval estimation unit 220 estimates a cycle of signals to be input to the communication network 180. Then, the timing estimation unit 230 estimates timings at which multiple signals will be detected in the communication network 180 later than the reference signal, based on a detection timing of the reference signal and the time interval.

The judgement unit 240 judges whether each of the multiple signals detected in the communication network 180 later than the reference signal is the normal signal, based on the timings that the timing estimation unit 230 has estimated, and detection timings of the multiple signals in the communication network 180 later than the reference signal. Specifically, the judgement unit 240 judges whether each of the multiple signals detected in the communication network 180 later than the reference signal is the normal signal, based on the timings that the timing estimation unit 230 has estimated, and detection timings of the multiple signals in the communication network 180 later than the reference signal.

The timing estimation unit 230 may calculate, timings that are calculated by adding a value of a time interval multiplied by a positive number to the detection timing of the reference signal, as timings at which the multiple signals will be detected in the communication network 180 later than the reference signal.

If a difference between a detection timing of a signal in the communication network 180 later than the reference signal and a timing that is estimated by the timing estimation unit 230 is a predetermined value or less, the judgement unit 240 may judge that the signal detected in the communication network 180 later than the reference signal is the normal signal.

The time interval estimation unit 220 may estimate a time interval, based on an average value of differences in detection timings of signals successively detected in the communication network 180 within a predetermined period.

The timing estimation unit 230 may calculate timings that are calculated by adding a value of a time interval multiplied by a positive number to the detection timing of the reference signal as timings at which the multiple signals will be detected in the communication network 180 later than the reference signal. The time interval estimation unit 220 may set a length of the predetermined period depending on the positive number that multiplies the time interval. The time interval estimation unit 220 may set the length of the predetermined period so that an error in an estimated timing as predicted by the timing estimation unit 230 from this positive number is a predetermined value or less. The time interval estimation unit 220 may update the time interval before a predetermined time elapses. The identification unit 210 may update the reference signal by identifying a signal detected later than detection of a currently set reference signal as a new reference signal, before the predetermined time elapses.

If a second signal that is not a target signal to be judged whether it is the normal signal is detected at a timing at which an estimated first signal is detected, the timing estimation unit 230 may newly estimate a timing obtained by adding a predetermined signal length to a detection timing of the second signal, as a timing at which the first signal will be detected.

If a difference between the detection timing of the first signal detected in the communication network 180 later than detection of the currently set reference signal, and a timing elapsed by a positive integer multiple of the time interval from the detection timing of the reference signal is a predetermined value or less, the identification unit 210 may identify the first signal as a new reference signal.

If a time interval between a first signal and a second signal successively detected in the communication network 180 is a predetermined interval or less, the identification unit 210 may not identify the second signal as the reference signal, and may identify the second signal as the reference signal with at least a requirement that the time interval between the first signal and the second signal successively detected in the communication network 180 exceeds the predetermined interval.

In the present embodiment, a signal having a predetermined specific CAN ID is a target to be judged as the normal signal or the abnormal signal. Therefore, unless particularly stated, signals assigned the specific CAN IDs will be featured in the present embodiment addresses A purpose of each diagram of the present embodiment is to show a signal transmitted through the communication network 180 in an easily understood manner. The each diagram is not intended to be a scaled representation on a fixed time scale.

Figure 3:
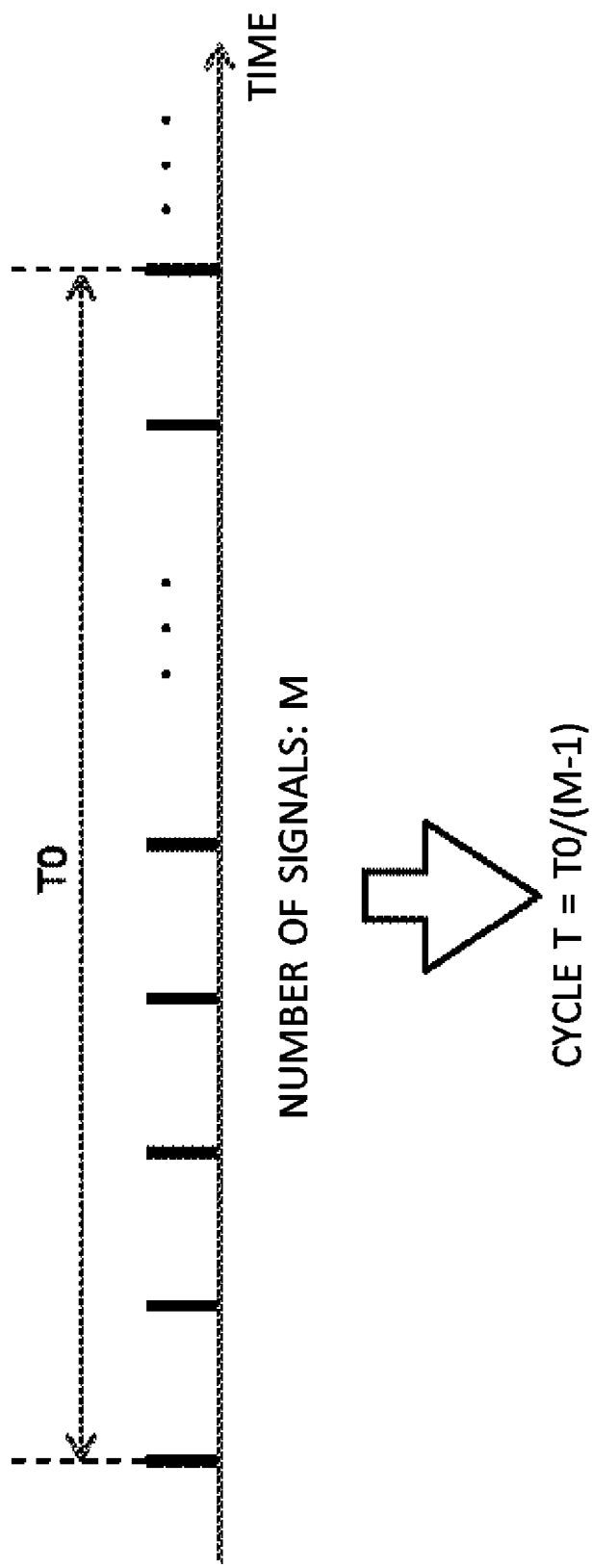
FIG. 3 is a diagram for explaining a method of calculating a signal cycle.

FIG. 3 is a diagram for explaining a method of calculating a signal cycle. As shown in FIG. 3, the abnormality determination apparatus 200 detects M signals in a period TO in the communication network 180. In this case, the time interval estimation unit 220 calculates a period T of a signal by using an average value T0/(M−1). In the present embodiment, for the purpose of explaining in an easily understood manner, the cycle of the signal is assumed to be calculated as 10 ms.

The time interval estimation unit 220 further calculates an estimation error of the period T of the signal. For example, the time interval estimation unit 220 may calculate a standard error as the estimation error of the period T of the signal.

Figure 4:
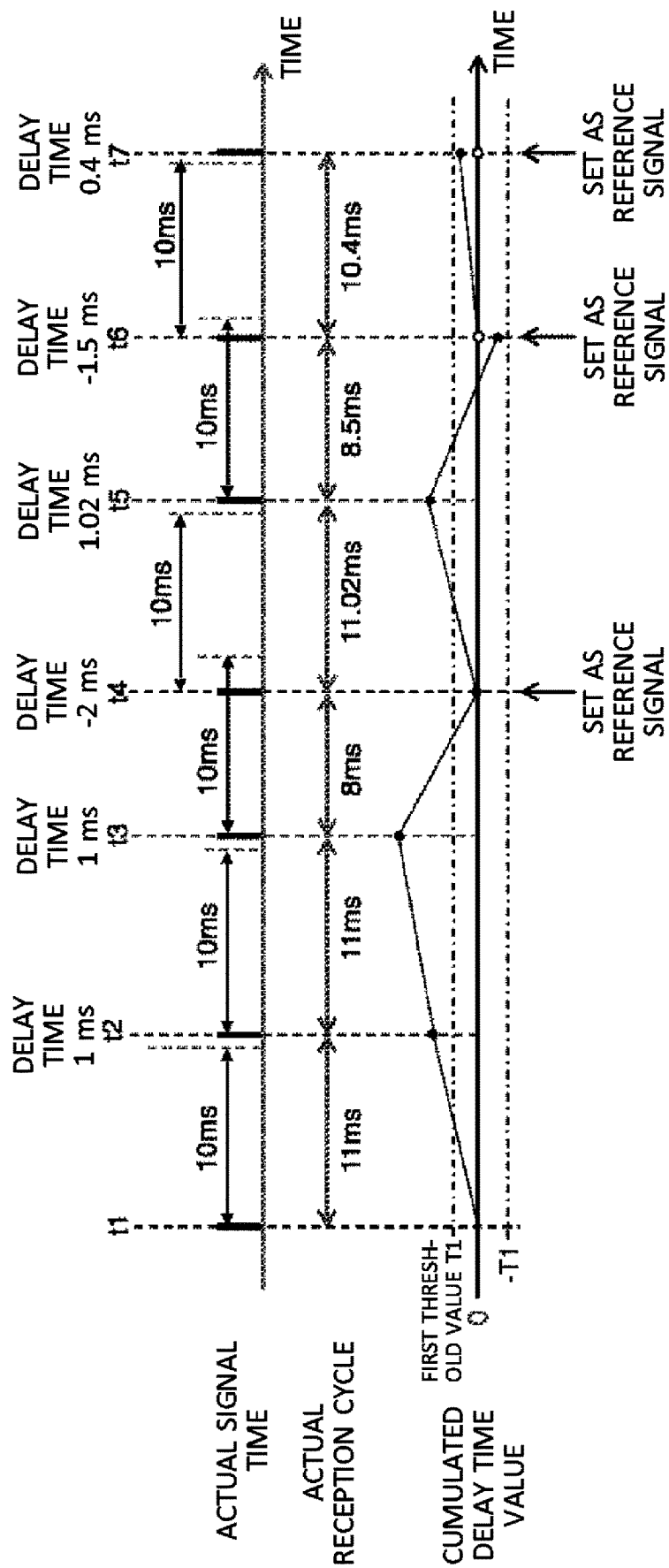
FIG. 4 is a diagram for explaining processing of setting a reference signal to be used for detecting an unauthorized signal.

FIG. 4 is a diagram for explaining processing of setting a reference signal to be used for detecting an unauthorized signal. In FIG. 4, the actual signal time shows times at which the abnormality determination apparatus 200 has actually detected signals in the communication network 180. In the present embodiment, it is explained that the times at which the signals are detected are times at which reception of the signals have ended. For example, the times at which the signals are detected may be times at which the abnormality determination apparatus 200 has finished receiving entire part of the signals. In another embodiment, times at which signals are detected may be times at which reception of the signals have started.

In FIG. 4, the actual signal cycle shows time intervals of signals successively detected in the communication network 180. In the present embodiment, a target signal to be processed is a signal expected to be input to the communication network 180 in a cycle of 10 ms. The identification unit 210 identifies a signal for which a difference (delay time) between a time elapsed from a detection time of a certain signal by a positive integer multiple of the cycle of 10 ms, and a detection time, is a first threshold value or less as the reference signal. The identification unit 210 calculates a cumulated delay time value by adding a delay time every time the identification unit 210 receives each signal. The identification unit 210 identifies a signal of which cumulated delay time value is a first threshold value or less as the reference signal. In the present embodiment, for showing the processing of setting the reference signal in an easily understood manner, the first threshold value is assumed to be 0.5 ms.

In FIG. 4, time t1 is a time at which a certain signal is detected in the communication network 180. The abnormality determination apparatus 200 detects next signal at time t2 when 11 ms has elapsed from time t1. The identification unit 210 calculates, a difference between time t2, and a timing at which a cycle of 10 ms has elapsed from time t1, as a delay time. Accordingly the delay time at time t2 is 1 ms. Therefore, the identification unit 210 calculates 1 ms as the cumulated delay time value at time t2. Because the cumulated delay time value exceeds the first threshold value, the identification unit 210 does not identify the signal received at time t2 as the reference signal.

Following this, the abnormality determination apparatus 200 detects another next signal at time t3 when 11 ms has further elapsed from time t2. The identification unit 210 calculates a difference between time t3 and a timing at which a cycle of 10 ms has elapsed from time t2 as a delay time. The delay time at time t3 is 1 ms. Therefore, the identification unit 210 calculates 2 ms as the cumulated delay time value at time t3. Because the cumulated delay time value exceeds the first threshold value, the identification unit 210 does not identify the signal received at time t3 as the reference signal.

Following this, the abnormality determination apparatus 200 detects another next signal at time t4 when 8 ms has further elapsed from time t3. The identification unit 210 calculates a difference between time t4 and a timing at which a cycle of 10 ms has elapsed from time t3 as a delay time. The delay time at time t4 is −2 ms. Therefore, the identification unit 210 calculates 0 ms as the cumulated delay time value at time t4. Because the cumulated delay time value is the first threshold value or less, the identification unit 210 identifies the signal received at time t4 as the reference signal, and sets time t4 as a reference time.

Following this, the abnormality determination apparatus 200 detects another next signal at time t5 when 11.02 ms has further elapsed from time t4. The identification unit 210 calculates a difference between time t5 and a timing at which a cycle of 10 ms has elapsed from time t4 as a delay time. The delay time at time t5 is 1.02 ms. Therefore, the identification unit 210 calculates 1.02 ms as the cumulated delay time value at time t4. Because the cumulated delay time value exceeds the first threshold value, the identification unit 210 does not identify the signal received at time t5 as the reference signal.

Following this, the abnormality determination apparatus 200 detects another next signal at time t6 when 8.5 ms has further elapsed from time t5. The identification unit 210 calculates a difference between time t6 and a timing at which a cycle of 10 ms has elapsed from time t5 as a delay time. The delay time at time t6 is −1.5 ms. Therefore, the identification unit 210 calculates −0.48 ms as the cumulated delay time value at time t6. Because an absolute value of the cumulated delay time value is the first threshold value or less, the identification unit 210 sets the signal received at time t6 as the reference signal, and sets time t6 as a reference time. At this time, the identification unit 210 resets the cumulated delay time value to zero.

Following this, the abnormality determination apparatus 200 detects another next signal at time t7 when 10.4 ms has further elapsed from time t6. The identification unit 210 calculates a difference between time t7 and a timing at which a cycle of 10 ms has elapsed from time t6 as a delay time. Since the cumulated delay time value has been reset to zero at time t6, the delay time at time t7 is 0.4 ms. Therefore, the identification unit 210 calculates 0.4 ms as the cumulated delay time value at time t7. Because the cumulated delay time value is the first threshold value or less, the identification unit 210 identifies the signal received at time t7 as the reference signal, and sets time t7 as a reference time.

In this manner, when the identification unit 210 detects a new signal, if a deviation between a timing at which this new signal is detected, and a reference timing that is a timing later than a reference time by a positive integer multiple of a signal cycle is a first threshold value or less, the identification unit 210 identifies this new signal as a reference signal. Then, the identification unit 210 set a time at which this new signal is detected as the reference time to be used for detecting an unauthorized signal.

Next, with reference to FIGS. 5 and 6, a situation in which a transmission delay occurs due to an input of a signal to the communication network 180 conflicting with an input of another signal will be explained.

Figure 5:
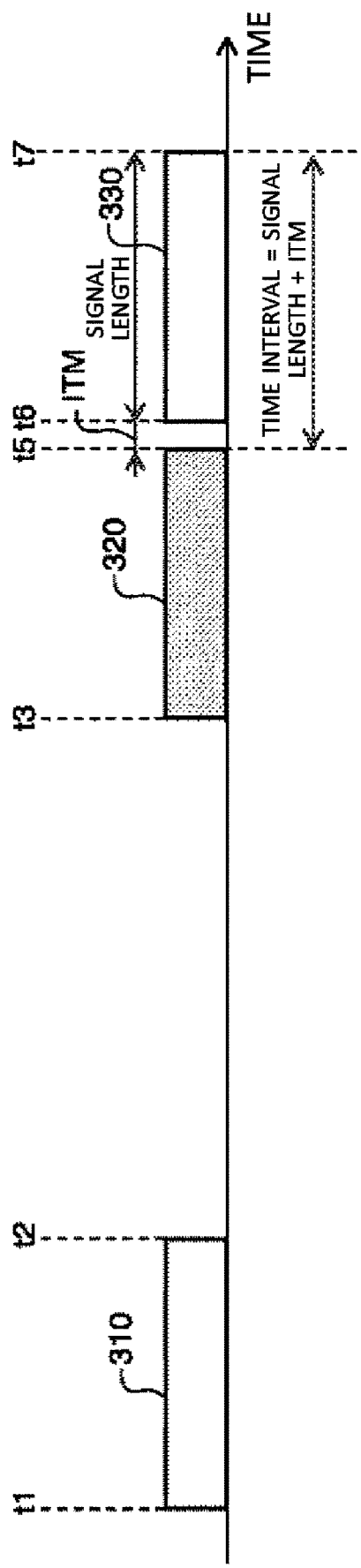
FIG. 5 diagrammatically illustrates a state in which a signal 330 is delayed from a cyclic input timing of 10 ms due to a conflict with another signal.

FIG. 5 diagrammatically illustrates a state in which a signal 330 is delayed from a cyclic input timing of 10 ms due to a conflict with another signal. In FIG. 5, a signal 310, a signal 320, and the signal 330 are signals successively input to the communication network 180.

The signal 310 is a signal of which input to the communication network 180 started from time t1, and ended at time t2. The signal 320 is a signal of which input to the communication network 180 started from time t3, and ended at time t5. The signal 320 is a signal of which input to the communication network 180 started from time t6, and ended at time t7.

In FIG. 5, the signals 310 and 330 are signals which belong to a group of signals input to the communication network 180 at the cycle of 10 ms. The signals 310 and 330 are signals assigned with the same CAN IDs. In FIG. 5, the signal 330 shows a state of being delayed from a cyclic input timing for the communication network 180 due to the signal 330 conflicting with the signal 320. Here, the signal 320 is a signal assigned with a CAN ID different from CAN IDs assigned to the signals 310 and 330. However, a similar processing can also be applied to a case in which a CAN ID of the signal 320 is the same as CAN IDs of the signals 310 and 330.

By way of example, as a result of the input of the signal 330 to the communication network 180 started simultaneously with the input of the signal 320, due to the communication conflict, the input of the signal 330 to the communication network 180 starts after time t5 that comes later than the input of the signal 320 to the communication network 180 has ended. In another example, a signal 330 is a signal of which input should start during a period in which a signal 320 is being input to the communication network 180. In the case of this example, the signal 330 waits for a bus to be in an idle state after the input of the signal 320 to the communication network 180 ends, and then the input of the signal 330 to the communication network 180 starts later than time t5.

If the signal 330 will be input to the communication network 180, after the input of a data frame of the signal 320 to the communication network 180 ends, the bus will be in an idle state after intermission (ITM) for three bits ends. Therefore, the signal 330 which has conflicted with the signal 320, may start its input to the communication network 180 from time t6 when a time has elapsed from time t5 till the end of the ITM. A time interval that corresponds to the ITM is a predetermined minimum time interval that should be kept between successive signals.

If a time interval between the signal 320 and the signal 330, that is, a time interval between time t5 and time t7 matches a total value of a signal length of the signal 330 and the ITM, the judgement unit 240 may determine that the signal 330 is delayed due to a conflict with the signal 320. Therefore, the judgement unit 240 judges that the signal 330 is a normal signal that is delayed due to the conflict. On the other hand, since the signal 330 is the signal that is delayed due to the conflict, the identification unit 210 does not identify the signal 330 as the reference signal.

In this manner, if a time interval between signals successively detected in the communication network 180 matches a total value of a signal length and ITM, the judgement unit 240 may judge that the signal 330 is a normal signal that is delayed due to conflicting with another signal. If a time interval between signals successively detected in the communication network 180 is shorter than a threshold value decided to set a predetermined margin on a total value of a signal length and ITM, the judgement unit 240 may judge that the signal 330 is a normal signal that is delayed due to conflicting with another signal.

Figure 6:
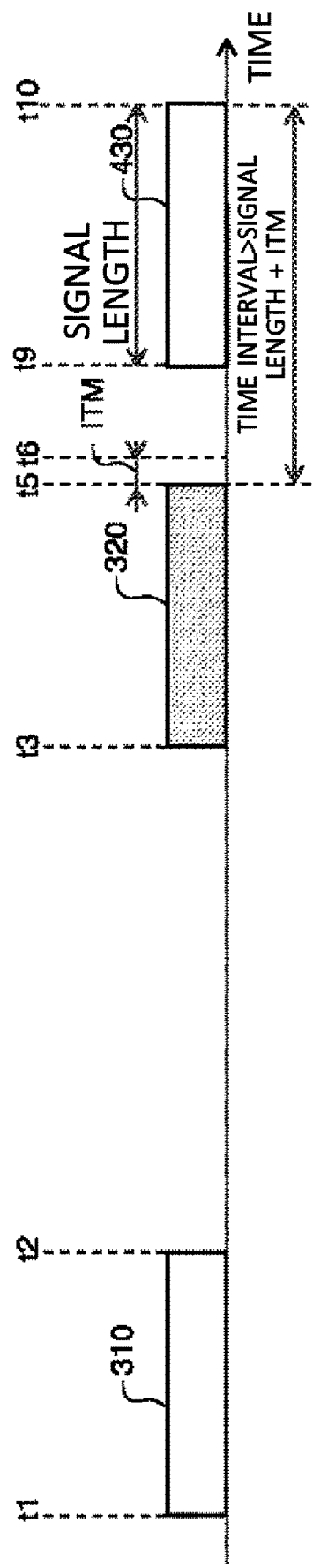
FIG. 6 diagrammatically illustrates a state in which a signal 430 is delayed from a cyclic input timing regardless of a conflict with another signal.

FIG. 6 diagrammatically illustrates a state in which a signal 430 is delayed from a cyclic input timing regardless of a conflict with another signal. A signal 310 and the signal 430 are signals including the same CAN IDs. Different from the situation illustrated in FIG. 5, the signal 430 is a signal that is delayed from a cyclic input timing without conflicting with a signal 320.

As shown in FIG. 6, an input of the signal 430 to the communication network 180 starts from time t9 later than time t6. If a time interval between the signal 320 and the signal 430, that is, a time interval between time t10 and time t5 is sufficiently longer than a total value of a signal length of the signal 430 and ITM, the judgement unit 240 may determine that the signal 430 is delayed from the cyclic input timing regardless of a conflict with the signal 320. Therefore, the judgement unit 240 judges that the signal 430 is an abnormal signal.

Figure 7:
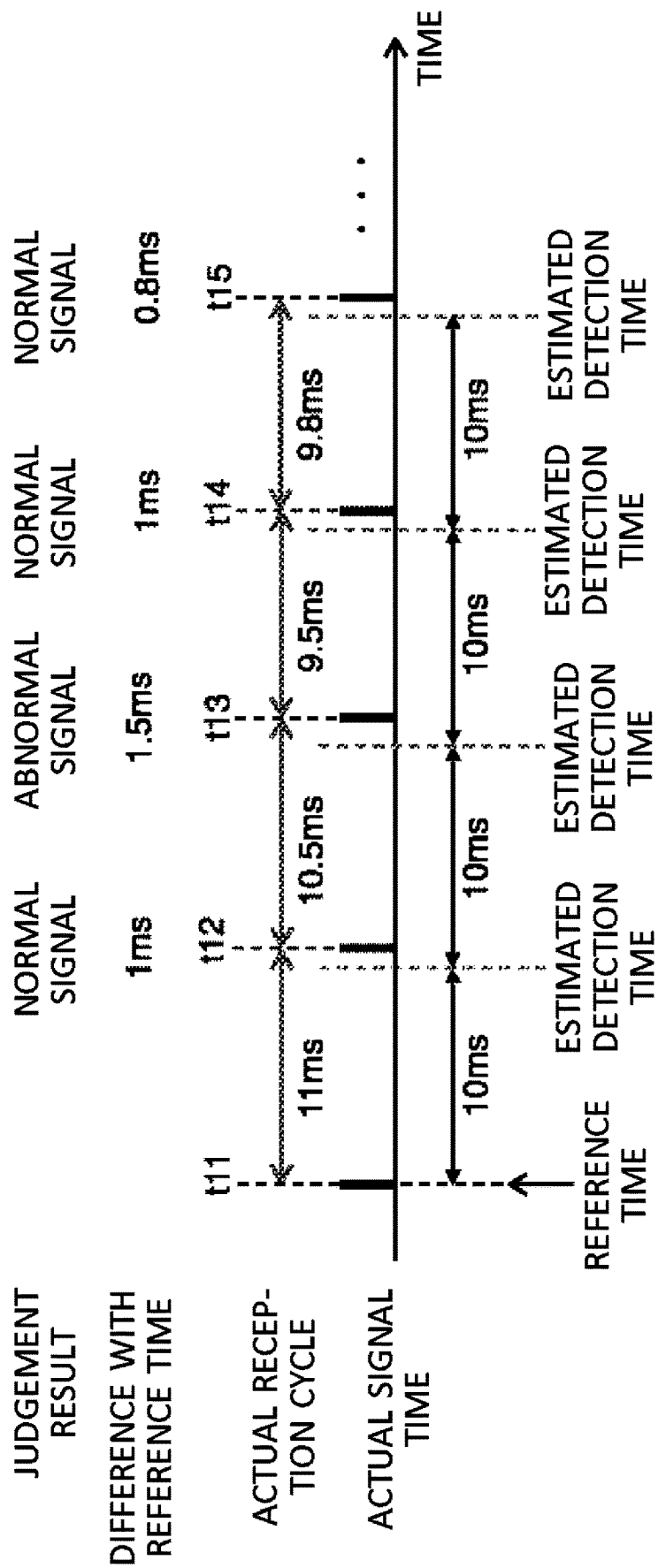
FIG. 7 is a diagram for explaining processing performed by a judgement unit 240 in judging whether a signal is a normal signal or an abnormal signal.

FIG. 7 is a diagram for explaining processing performed by the judgement unit 240 in judging whether a signal is a normal signal or an abnormal signal. Referring to FIG. 7, a case of judging whether a detected signal is a normal signal or an abnormal signal after time t11 being set as a reference time will be explained.

In the present embodiment, for showing judgement processing of the judgement unit 240 in an easily understood manner, a second threshold value for judging whether a signal is a normal signal or an abnormal signal is 1 ms. That is, if a difference between a time at which a signal is detected, and an estimated detection time that is estimated from a reference time and a period T is 1 ms or less, the judgement unit 240 judges that the detected signal is a normal signal. The second threshold value may be set in consideration of an estimation error of the estimated detection time calculated based on an estimation error of the period T. In the present embodiment, for the purpose of ease of illustration, the first threshold value (0.5 ms) is explained as being half the second threshold value (1 ms), whereas the first threshold value can be one-fifth or less of the second threshold value. The first threshold value can be one-tenth of the second threshold value.

Referring to FIG. 7, the abnormality determination apparatus 200 detects a new signal at time t12 when 11 ms has elapsed from time t11. The timing estimation unit 230 estimates a time later than the reference time by a cycle of 10 ms as an estimated detection time at which a next signal of a signal at time t11 should be detected. A difference between time t12 and the estimated detection time is 1 ms. That is, the difference between time t12 and the estimated detection time is 1 ms or less. Therefore, the judgement unit 240 judges that the signal detected at time t12 is a normal signal.

Following this, the abnormality determination apparatus 200 detects a new signal at time t13 when 10.5 ms has elapsed from time t12. The timing estimation unit 230 estimates a time later than the reference time by 10×2 ms as an estimated detection time at which a next signal of a signal at time t12 should be detected. A difference between time t13 and the estimated detection time is 1.5 ms. That is, the difference between time t13 and the estimated detection time exceeds 1 ms. Therefore, the judgement unit 240 judges that the signal detected at time t13 is an abnormal signal.

As explained in association to FIG. 4 etc., if an input of a signal to the communication network 180 conflicts with another signal, a detection time of the signal may be delayed from the estimated detection time. Accordingly, the judgement unit 240 may judge whether the signal detected at time t13 is delayed due to conflicting with another signal during input to the communication network 180. If the judgement unit 240 may judge that the signal detected at time t13 is delayed due to conflicting with another signal during transmission, the judgement unit 240 may judge that the signal detected at time t13 is a normal signal. If the judgement unit 240 judges that the signal detected at time t13 is not delayed due to conflicting with another signal during transmission, the judgement unit 240 may judge that the signal detected at time t13 is an abnormal signal. This processing will be specifically explained in association to FIG. 8.

Following this, the abnormality determination apparatus 200 detects a new signal at time t14 when 9.5 ms has elapsed from time t13. The timing estimation unit 230 sets a time later than the reference time by 10×3 ms as an estimated detection time at which a next signal of a signal at time t13 should be detected. A difference between time t14 and the estimated detection time is 1 ms. That is, the difference between time t14 and the estimated detection time is 1 ms or less. Therefore, the judgement unit 240 judges that a signal detected at time t14 is a normal signal.

Following this, the abnormality determination apparatus 200 detects a new signal at time t15 when 9.8 ms has elapsed from time t14. The timing estimation unit 230 sets a time later than the reference time by 10×4 ms as an estimated detection time at which a next signal of a signal at time t14 should be detected. A difference between time t15 and the reference timing is 0.8 ms. That is, time t15 is within a range of ±1 ms from a center of the reference timing. Therefore, the judgement unit 240 judges that the signal detected at time t15 is a normal signal.

In this manner, the timing estimation unit 230 estimates times later than the reference time by a positive integer multiple of a cycle of 10 ms as estimated detection times at which multiple signals to be input to the communication network 180 later than the reference time should be detected. If a difference between a detection time of a new signal and its corresponding estimated detection time is a predetermined value or less, the judgement unit 240 judges that the new signal is a normal signal. On the other hand, if a difference between a detection time of a new signal and its corresponding estimated detection time exceeds the predetermined value, the judgement unit 240 may judge that the new signal is an abnormal signal.

As described above, the estimated detection time is estimated by adding a cycle to a specific reference time. Because estimation errors of periods T are cumulated at the estimated detection time, the longer a time elapsed from the reference time is, the lower estimation accuracy of the estimated detection time becomes. Therefore, it is desirable that the identification unit 210 updates the reference time before the cumulated errors caused by the number of times of additions (i.e., a positive number to multiply the cycle) of the estimation errors of cycles and the cycles reaches a predetermined value. For example, it is desirable that the identification unit 210 updates the reference time before the number of times of additions of cycles used for the calculation of the estimated detection time reaches a predetermined maximum value. Further, it is desirable that the time interval estimation unit 220 sets the period TO explained in association to FIG. 3 according to the number of times of additions of the cycles used for the calculation of the estimated detection time. For example, the time interval estimation unit 220 may set the period TO according to a maximum value of the number of times of additions of the cycles used for the calculation of the estimated detection time. By way of example, it is desirable that, the more the number of times of additions of the cycles used for the calculation of the estimated detection time is, the longer a period set by the time interval estimation unit 220 as the period TO becomes. In addition to that, it is desirable that the time interval estimation unit 220 updates a period T every time a predetermined time elapses.

Figure 8:
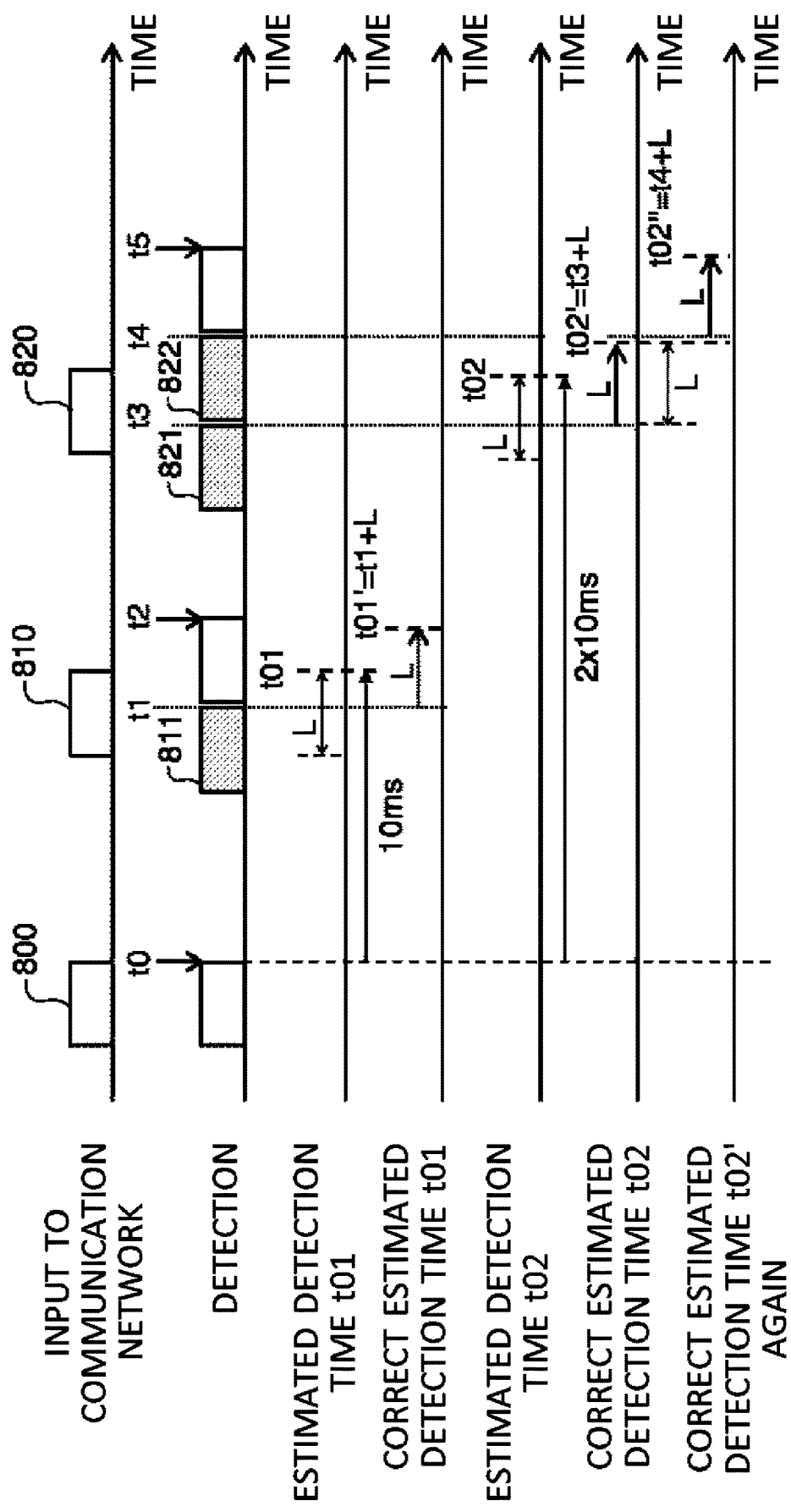
FIG. 8 illustrates judgement processing that is performed when a signal input to a communication network 180 conflicts with another signal.

FIG. 8 illustrates judgement processing that is performed when a signal input to the communication network 180 conflicts with another signal. In FIG. 8, a signal 800, a signal 810, and a signal 820 are input to the communication network 180 from a specific ECU, and are signals that are targets to be judged whether they are normal signals in the ECU 110. A signal 811, a signal 821, and a signal 822 are signals input to the communication network 180 from another ECU. The signals 811, 821, and 822 are assigned with CAN IDs different from the CAN IDs assigned to the signals 800, 810, and 820.

The abnormality determination apparatus 200 detects the signal 800 at time t0. Here, time t0 is a reference time. The timing estimation unit 230 estimates a time t01 later than the reference time t0 by a cycle of 10 ms as an estimated detection time at which the signal 810 should be detected in the communication network 180. Further, the timing estimation unit 230 estimates a time t02 later than the reference time t0 by 2×10 ms as an estimated detection time at which the signal 820 should be detected in the communication network 180.

As shown in FIG. 8, the signal 810 is delayed from the estimated detection time t01 because of being delayed due to a conflict with the signal 811, and detected at time t2. The judgement unit 240 judges, within a period from a time prior to the estimated detection time t01 by a predetermined period to the estimated detection time t01, whether a signal assigned with a CAN ID other than a target CAN ID to be judged is detected. By way of example, the judgement unit 240 may judge, within a period from a time prior to the estimated detection time t01 by a signal length L to the estimated detection time t01, whether a signal assigned with a CAN ID other than a target CAN ID to be judged is being input to the communication network 180.

As shown in FIG. 8, the signal 811 is input within the period from the time prior to the estimated detection time t01 by the signal length L to the estimated detection time t01. In this case, the judgement unit 240 judges that a next signal of the signal 800 is delayed due to a conflict with the signal 811. In this case, the judgement unit 240 corrects the estimated detection time t01 by setting a time later than a detection time t1 of the signal 811 by the signal length L as a new estimated detection time t0r. The judgement unit 240 determines whether the signal 810 detected at time t2 is a normal signal by comparing time t2 at which the signal 810 is detected and the estimated detection time t01'. In the example of FIG. 8, because a difference between time t2 at which the signal 810 is detected and the estimated detection time t01' is 1 ms or less, the judgement unit 240 judges that the signal 810 detected at time t2 is a normal signal.

Next, processing for the signal 820 will be explained. As shown in FIG. 8, the signal 820 is, after being delayed due to a conflict with the signal 821, delayed further due to a conflict with the signal 822, thus delayed from the estimated detection time t02 and detected at time t5. The judgement unit 240 judges, within a period from a time prior to the estimated detection time t02 by a predetermined period to the estimated detection time t02, whether a signal assigned with a CAN ID other than a target CAN ID to be judged is detected. By way of example, the judgement unit 240 may judge, within a period from a time prior to the estimated detection time t02 by the signal length L to the estimated detection time t02, whether a signal assigned with a CAN ID other than a target CAN ID to be judged is being input to the communication network 180.

As shown in FIG. 8, the signal 821 is input within the period from the time prior to the estimated detection time t02 by the signal length L to the estimated detection time t02. In this case, the judgement unit 240 judges that a next signal of the signal 810 is delayed due to a conflict with the signal 821. In this case, the judgement unit 240 corrects the estimated detection time t02 by setting a time later than a detection time t3 of the signal 821 by the signal length L as a new estimated detection time t02'.

As shown in FIG. 8, the signal 822 is input within a period from a time prior to the corrected estimated detection time t02' by the signal length L to the estimated detection time t02. In this case, the judgement unit 240 judges that the next signal of the signal 810 is delayed due to a conflict with the signal 822. In this case, the judgement unit 240 further corrects the estimated detection time t02' by setting a time later than a detection time t4 of the signal 822 by the signal length L as a new estimated detection time t02". The judgement unit 240 determines whether the signal 820 detected at time t5 is a normal signal by comparing time t5 at which the signal 820 is detected and the estimated detection time t02". In the example of FIG. 8, because a difference between time t5 at which the signal 820 is detected and the estimated detection time t02" is 1 ms or less, the judgement unit 240 judges that the signal 820 detected at time t5 is a normal signal.

Figure 9:
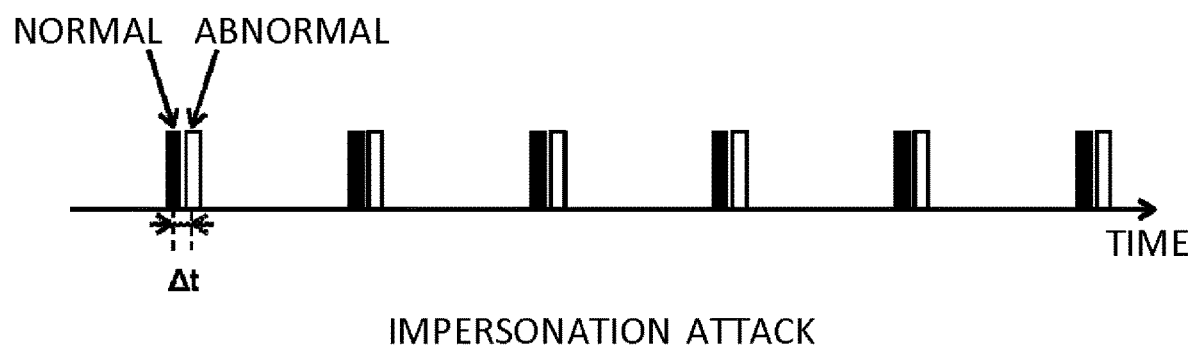
FIG. 9 illustrates an example of a case in which it is determined that an impersonation attack has been performed.

FIG. 9 illustrates an example of a case in which it is determined that an impersonation attack has been performed. In FIG. 9 normal signals are colored with black, and abnormal signals are colored with white. FIG. 9 shows a case in which an abnormal signal is detected within a predetermined time range after a detection time of a normal signal.

The determination unit 250 determines that an impersonation attack has been performed against the communication network 180, if an abnormal signal is detected after a normal signal for each of multiple normal signals, if a difference $\Delta t$ between a detection time of the normal signal and a detection time of the abnormal signal detected immediately after the normal signal is a predetermined time or less, and if the number of abnormal signals detected between successive normal signals is a predetermined number or less.

Figure 10:
FIG. 10 illustrates another example of the case in which it is determined that an impersonation attack has been performed.

FIG. 10 illustrates another example of the case in which it is determined that an impersonation attack has been performed. In FIG. 10, normal signals are colored with black, and abnormal signals are colored with white. FIG. 10 shows a case in which an abnormal signal is detected within a predetermined time range before a detection time of a normal signal.

The determination unit 250 determines that an impersonation attack has been performed against the communication network 180, if an abnormal signal is detected before a normal signal for each of multiple normal signals, if a difference $\Delta t$ between a detection time of the normal signal and a detection time of the abnormal signal detected immediately before the normal signal is a predetermined time or less, and if the number of abnormal signals detected between successive normal signals is a predetermined number or less.

Figure 11:
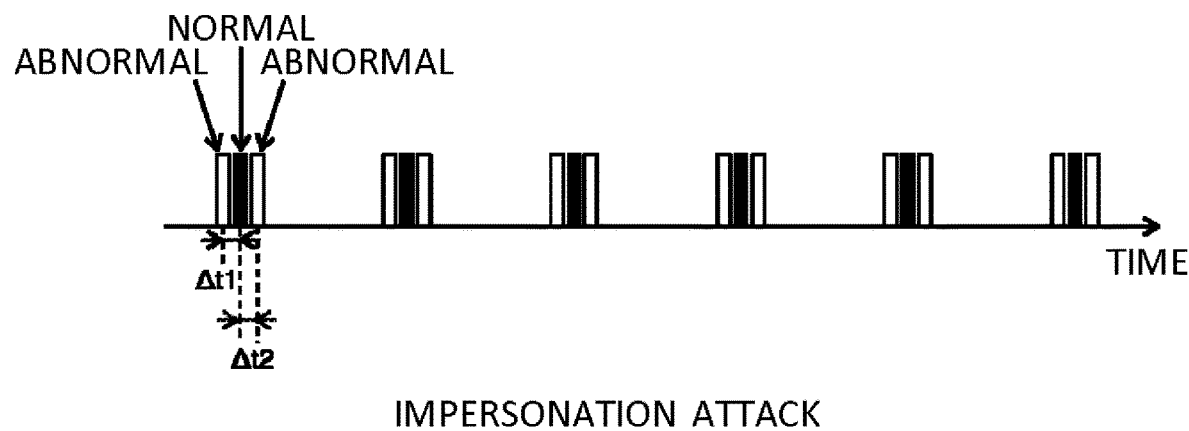
FIG. 11 illustrates yet another example of the case in which it is determined that an impersonation attack has been performed.

FIG. 11 illustrates yet another example of the case in which it is determined that an impersonation attack has been performed. In FIG. 11, normal signals are colored with black, and abnormal signals are colored with white. FIG. 11 shows a case in which abnormal signals are detected within a predetermined time range before and after a detection time of a normal signal.

The determination unit 250 determines that an impersonation attack has been performed against the communication network 180, if abnormal signals are detected before and after a normal signal for each of multiple normal signals, if a difference $\Delta t1$ between a detection time of the normal signal and a detection time of the abnormal signal detected immediately before the normal signal is a predetermined time or less, if a difference $\Delta t2$ between the detection time of the normal signal and a detection time of the abnormal signal detected immediately after the normal signal is a predetermined time or less, and if the number of abnormal signals detected between successive normal signals is a predetermined number or less.

Figure 12:
FIG. 12 illustrates an example of a case in which it is determined that a denial-of-service (DoS) attack has been performed.

FIG. 12 illustrates an example of a case in which it is determined that a denial-of-service (DoS) attack has been performed. In FIG. 12, normal signals are colored with black, and abnormal signals are colored with white. FIG. 12 shows a case in which abnormal signals exceeding a predetermined number are detected between normal signals which are successively detected.

The determination unit 250 determines that a DoS attack against the communication network 180 has been performed, if abnormal signals exceeding a number N D predetermined between normal signals are detected for each set of normal signals which are successively detected. By way of another method, if a density of abnormal signals detected between normal signals exceeds a predetermined value for each set of normal signals which are successively detected, the determination unit 250 may determine that a DoS attack against the communication network 180 has been performed. By way of yet another method, if a maximum value of an interval between abnormal signals detected between normal signals is a predetermined value or less for each set of normal signals which are successively detected, the determination unit 250 may determine that a DoS attack against the communication network 180 has been performed.

Figure 13:
FIG. 13 illustrates another example of a case in which it is determined that an abnormality has occurred in an ECU connected to the communication network 180.

FIG. 13 illustrates another example of a case in which it is determined that an abnormality has occurred in an ECU connected to the communication network 180. In FIG. 13, normal signals are colored with black, and abnormal signals are colored with white. FIG. 13 shows a case in which regularity in abnormal signals detected between normal signals which are successively detected is lower than a predetermined value.

The determination unit 250 determines that an abnormality has occurred in an ECU connected to the communication network 180, if regularity in detection times of abnormal signals detected between normal signals is lower than the predetermined value for each set of normal signals which are successively detected. The regularity in the detection times of the abnormal signals may be a value that is expressed as an indicator of, for example, a variation in time intervals between a normal signal and an abnormal signal which are successively detected, a variation in time intervals between abnormal signals which are successively detected, and the like. The variation in time intervals may be, for example, a value expressed as a standard deviation of time intervals.

Figure 14:
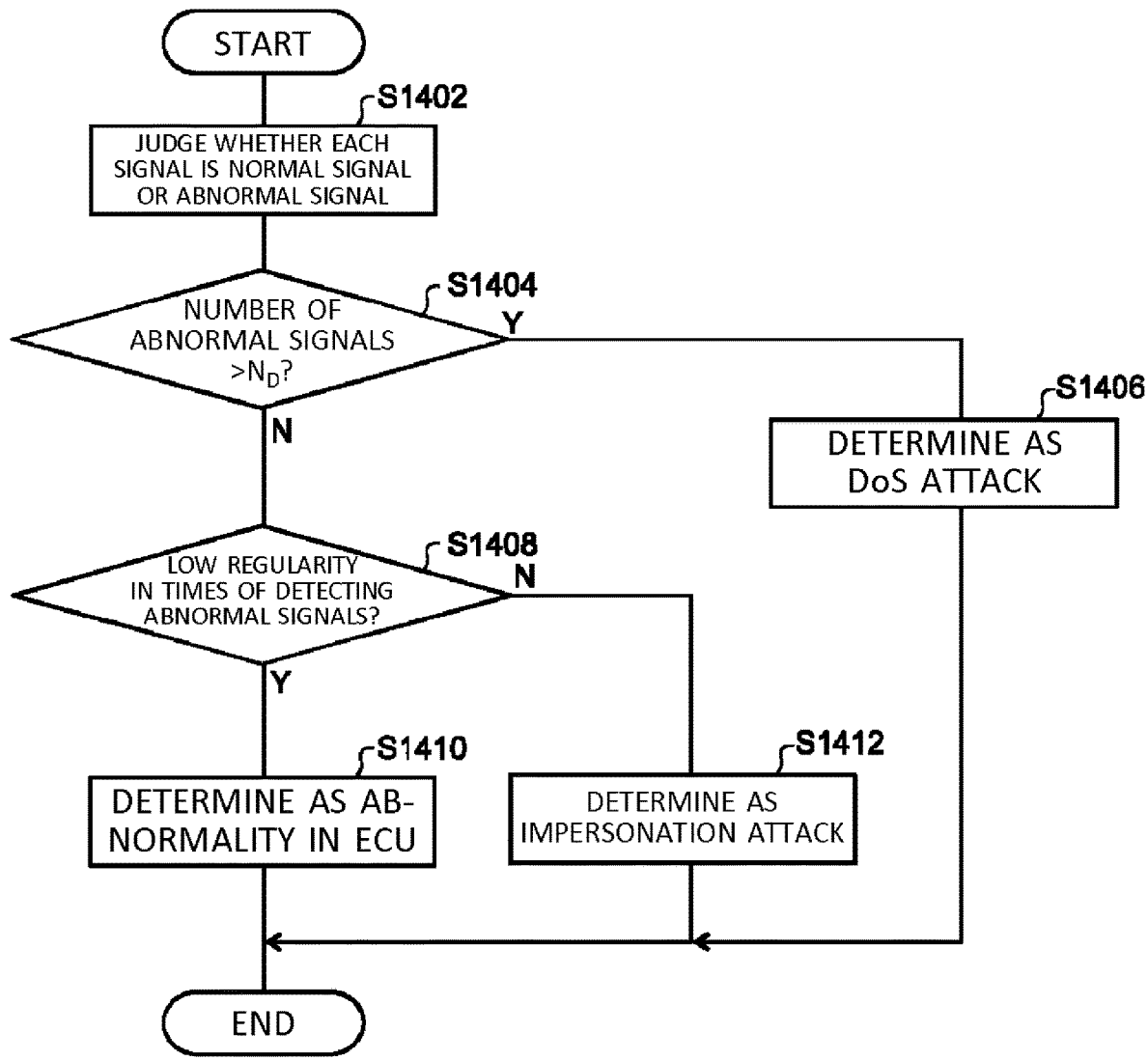
FIG. 14 is a flowchart showing processing related to an abnormality determination method executed by an ECU 110.

FIG. 14 is a flowchart showing processing related to an abnormality determination method executed by the ECU 110. The processing of the present flowchart is performed on multiple signals detected within a predetermined period, after an abnormal signal is detected.

In S1402, the judgement unit 240 judges whether each of detected multiple signals is a normal signal or an abnormal signal. For the processing of S1402, a method explained in association to FIG. 7 etc. can be adopted.

In S1404, the determination unit 250 determines whether the number of abnormal signals detected between successive normal signals exceeds a predetermined number $N_D$. The determination unit 250 determines that a DoS attack has been performed against the communication network 180, if the number of abnormal signals detected between successive normal signals exceeds the predetermined number $N_D$, in S1406.

If the determination unit 250 determines that the number of abnormal signals detected between successive normal signals is the predetermined number N D or less in S1404, the determination unit 250 determines whether regularity in detection times of abnormal signals is lower than a predetermined value in S1408. If the regularity in detection times of abnormal signals is lower than the predetermined value, then in S1410, the determination unit 250 determines that abnormality has occurred in an ECU connect to the communication network 180.

If the determination unit 250 determines that the regularity in detection times of abnormal signals is the predetermined value or more in S1408, then in S1412, the determination unit 250 determines that an impersonation attack has been performed against the communication network 180. As explained in association to FIGS. 9, 10, 11, etc., in S1412, the determination unit 250 may further determine whether the impersonation attack has been performed against the communication network 180, based on a difference between a detection time of a normal signal and a detection time of an abnormal signal.

If it is determined in S1406 that a DoS attack has been performed, the abnormality determination apparatus 200 may inform an external server that collects states of the mobile object 10 of a fact that the DoS attack has been performed. If it is determined that a DoS attack has been performed, the abnormality determination apparatus 200 may inform an occupant of the mobile object 10 of a fact that the DoS attack has been performed.

If it is determined in S1412 that an impersonation attack has been performed, the abnormality determination apparatus 200 may inform an external server that collects states of the mobile object 10 of a fact that the impersonation attack has been performed. If it is determined that an impersonation attack has been performed, the abnormality determination apparatus 200 may inform an occupant of the mobile object 10 of a fact that the impersonation attack has been performed.

If it is determined in S1410 that abnormality has occurred in an ECU connected to the communication network 180, the abnormality determination apparatus 200 may inform an external server that collects states of the mobile object 10 of a fact that the abnormality has occurred in the ECU. If it is determined that abnormality has occurred in an ECU, the abnormality determination apparatus 200 may inform an occupant of the mobile object 10 of a fact that the abnormality has occurred in the mobile object 10.

According to the abnormality determination apparatus 200 of the present embodiment, it is possible to properly judge whether each signal detected in the communication network 180 is a normal signal or an abnormal signal. Because the communication network 180 is expected to be cyclically input with signals, according to the abnormality determination apparatus 200 of the present embodiment, it is possible to appropriately determine whether an impersonation attack or a DoS attack has been performed, and whether abnormality has occurred in an ECU, based on distribution of detection times of detected normal signals and detected abnormal signals, without using a time stamp for each signal. This enables an occupant of the mobile object 10 to take an appropriate action.

Figure 15:
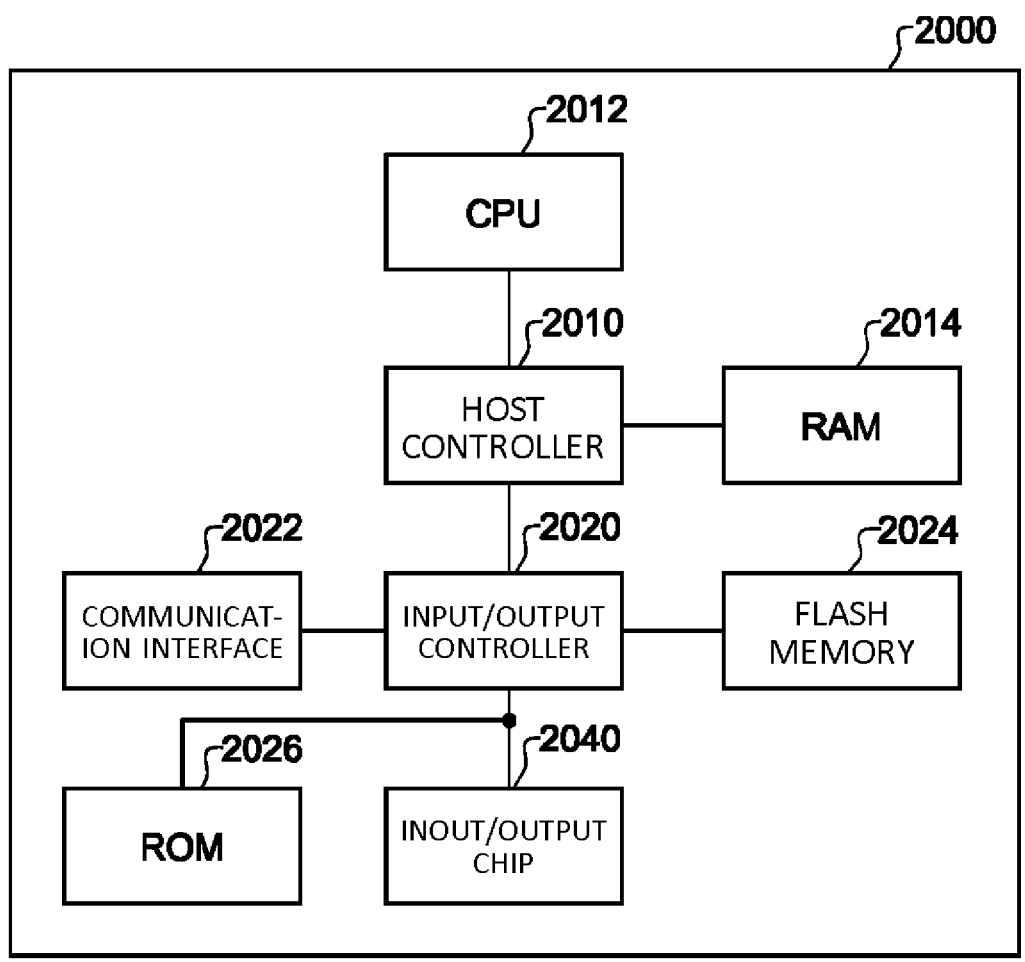
FIG. 15 illustrates an example of a computer 2000.

FIG. 15 illustrates an example of a computer 2000 in which a plurality of embodiments of the present invention can be entirely or partially embodied. A program installed in the computer 2000 can allow the computer 2000 to: function as a system such as the system 20 according to embodiments or components of the system, or as an apparatus such as the ECU 110 or components of this apparatus; perform operations associated with this system or components of this system or with this apparatus or components of this apparatus; and/or perform processes according to the embodiments or stages in these processes. Such a program may be executed by a CPU 2012 in order to cause the computer 2000 to execute a specific operation associated with some or all of the processing procedures and the blocks in the block diagrams described herein.

The computer 2000 according to the present embodiment includes the CPU 2012 and a RAM 2014, which are mutually connected by a host controller 2010. The computer 2000 also includes a ROM 2026, a flash memory 2024, a communication interface 2022, and an input/output chip 2040. The ROM 2026, the flash memory 2024, the communication interface 2022, and the input/output chip 2040 are connected to the host controller 2010 via an input/output controller 2020.

The CPU 2012 operates according to programs stored in the ROM 2026 and the RAM 2014, and thereby controls each unit.

The communication interface 2022 communicates with another electronic device via a network. The flash memory 2024 stores a program and data used by the CPU 2012 in the computer 2000. The ROM 2026 stores a boot program or the like executed by the computer 2000 during activation, and/or a program depending on hardware of the computer 2000. The input/output chip 2040 may also connect various input/output units such as a keyboard, a mouse, and a monitor, to the input/output controller 2020 via input/output ports such as a serial port, a parallel port, a keyboard port, a mouse port, a monitor port, a USB port, a HDMI (registered trademark) port.

A program is provided via a network or a computer-readable storage medium such as a CD-ROM, a DVD-ROM, or a memory card. The RAM 2014, the ROM 2026, or the flash memory 2024 is an example of the computer-readable storage medium. The program is installed in the flash memory 2024, the RAM 2014 or the ROM 2026 and executed by the CPU 2012. Information processing written in these programs is read by the computer 2000, and provides cooperation between the programs and the various types of hardware resources described above. An apparatus or a method may be actualized by executing operations or processing of information depending on a use of the computer 2000.

For example, when communication is executed between the computer 2000 and an external device, the CPU 2012 may execute a communication program loaded in the RAM 2014, and instruct the communication interface 2022 to execute communication processing based on processing written in the communication program. Under the control of the CPU 2012, the communication interface 2022 reads transmission data stored in a transmission buffer processing region provided in a recording medium such as the RAM 2014 or the flash memory 2024, transmits the read transmission data to the network, and writes reception data received from the network into a reception buffer processing region or the like provided on the recording medium.

In addition, the CPU 2012 may cause all or a necessary portion of a file or a database stored in a recording medium such as the flash memory 2024 to be read into the RAM 2014, and execute various kinds of processing on the data on the RAM 2014. Next, the CPU 2012 writes back the processed data into the recording medium.

Various types of information such as various types of programs, data, a table, and a database may be stored in the recording medium and may be subjected to information processing. The CPU 2012 may execute, on the data read from the RAM 2014, various kinds of processing including various kinds of operations, information processing, conditional judgement, conditional branching, unconditional branching, information retrieval/replacement, or the like described herein and specified by instruction sequences of the programs, and write back a result into the RAM 2014. In addition, the CPU 2012 may retrieve information in a file, a database, or the like in the recording medium. For example, when multiple entries each having an attribute value of a first attribute associated with an attribute value of a second attribute, is stored in the recording medium, the CPU 2012 may retrieve an entry having a designated attribute value of the first attribute that matches a condition from these multiple entries, and read the attribute value of the second attribute stored in this entry, thereby obtaining the attribute value of the second attribute associated with the first attribute that satisfies a predetermined condition.

The programs or software modules explained above may be stored in the computer-readable storage medium on the computer 2000 or in the vicinity of the computer 2000. A recording medium such as a hard disk or a RAM provided in a server system connected to a dedicated communication network or the Internet can be used as the computer-readable storage medium. A program stored in the computer-readable storage medium may be provided to the computer 2000 via a network.

A program, which is installed on the computer 2000 and causes the computer 2000 to function as the ECU 110, may work on the CPU 2012 or the like to cause the computer 2000 to function as components of the ECU 110. The information processing written in these programs are read by the computer 2000 to cause the computer to function as components of the ECU 110, which is specific means realized by the cooperation of software and the various types of hardware resources described above. Then, by the specific means by which calculation or processing of information according to a purpose of use of the computer 2000 in the present embodiment is performed, the unique ECU 110 according to the purpose of use is constructed.

Various embodiments have been explained with reference to the block diagrams and the like. In the block diagrams, each block may represent (1) a stage of a process in which an operation is executed, or (2) components of the apparatus having a role in executing the operation. A specific stage and component may be implemented by a dedicated circuit, a programmable circuit supplied with computer-readable instructions stored on a computer-readable storage medium, and/or a processor supplied with computer-readable instructions stored on a computer-readable storage medium. The dedicated circuit may include a digital and/or analog hardware circuit, or may include an integrated circuit (IC) and/or a discrete circuit. The programmable circuit may include a reconfigurable hardware circuit including logical AND, logical OR, logical XOR, logical NAND, logical NOR, and another logical operation, and a memory element such as a flip-flop, a register, a field programmable gate array (FPGA), a programmable logic array (PLA), or the like.

The computer-readable storage medium may include any tangible device capable of storing instructions to be executed by an appropriate device. Thereby, the computer-readable storage medium having instructions stored therein forms at least a part of a product including instructions which can be executed to provide means for executing processing procedures or operations specified in the block diagrams. Examples of the computer-readable storage medium may include an electronic storage medium, a magnetic storage medium, an optical storage medium, an electromagnetic storage medium, a semiconductor storage medium, and the like. More specific examples of the computer-readable storage medium may include a floppy (registered trademark) disk, a diskette, a hard disk, a random access memory (RAM), a read only memory (ROM), an erasable programmable read only memory (EPROM or flash memory), an electrically erasable programmable read only memory (EEPROM), a static random access memory (SRAM), a compact disk read only memory (CD-ROM), a digital versatile disc (DVD), a Blu-ray (registered trademark) disc, a memory stick, an integrated circuit card, or the like.

The computer-readable instruction may include an assembler instruction, an instruction-set-architecture (ISA) instruction, a machine instruction, a machine dependent instruction, a microcode, a firmware instruction, state-setting data, or either of source code or object code written in any combination of one or more programming languages including an object-oriented programming language such as Smalltalk (registered trademark), JAVA (registered trademark), and C++, and a conventional procedural programming language such as a "C" programming language or a similar programming language.

Computer-readable instructions may be provided to a processor of a general purpose computer, a special purpose computer, or another programmable data processing device, or to programmable circuit, locally or via a local area network (LAN), wide area network (WAN) such as the Internet, and a computer-readable instruction may be executed to provide means for executing operations specified in the explained processing procedures or block diagrams. An example of the processor includes a computer processor, processing unit, microprocessor, digital signal processor, controller, microcontroller, or the like.

While the present invention has been explained with the embodiments above, the technical scope of the present invention is not limited to the above-described embodiments. It is apparent to persons skilled in the art that various changes or improvements can be made to the above-described embodiments. It is also apparent from the description of the claims that the embodiments to which such changes or improvements are made can be included in the technical scope of the present invention.

Each process of the operations, procedures, steps, and stages etc. in the apparatus, system, program, and method shown in the claims, specification, or diagrams can be executed in any order as long as the order is not indicated by "prior to", "before", or the like and as long as the output from a previous process is not used in a later process. Even if the operational flow is explained using phrases such as "first" or "next" in the claims, specification, or diagrams, it does not necessarily mean that the process must be performed in this order.

EXPLANATION OF REFERENCES

10: mobile object; 20: system; 100: ECU; 110: ECU; 111: ECU; 120: ECU; 121: ECU; 180: communication network; 200: abnormality determination apparatus; 210: identification unit; 220: time interval estimation unit; 230: timing estimation unit; 240: judgement unit; 250: determination unit; 280: storage unit; 310, 320, 330, 430, 800, 810, 811, 820, 821, 822: signal; 2000: computer; 2010: host controller; 2012: CPU; 2014: RAM; 2020: input/output controller; 2022: communication interface; 2024: flash memory; 2026: ROM; 2040: input/output chip.

What is claimed is:

1. An abnormality determination apparatus in a communication network expected to be cyclically input with signals, comprising:
   a judgement unit which judges, based on detection timings of multiple signals in the communication network, whether each of the multiple signals is either a normal signal or an abnormal signal; and
   a determination unit which determines, if there is detected a signal judged as the abnormal signal, a type of abnormality having occurred in the communication network based on distribution of detection timings of multiple signals detected at a timing at which the signal judged as the abnormal signal is detected in the communication network or later, wherein each of the multiple signals is judged as the normal signal or the abnormal signal, wherein
   the determination unit determines a type of attack performed by inputting an unauthorized signal to the communication network, based on a sequence of detection timings of the multiple signals each judged as the normal signal or the abnormal signal.

2. An abnormality determination apparatus in a communication network expected to be cyclically input with signals, comprising:
   a judgement unit which judges, based on detection timings of multiple signals in the communication network, whether each of the multiple signals is either a normal signal or an abnormal signal; and
   a determination unit which determines, if there is detected a signal judged as the abnormal signal, a type of abnormality having occurred in the communication network based on distribution of detection timings of multiple signals detected at a timing at which the signal judged as the abnormal signal is detected in the communication network or later, wherein each of the multiple signals is judged as the normal signal or the abnormal signal, wherein
   the determination unit determines that an attack has been performed on the communication network, if a regularity in detection timings of the multiple signals each judged as the abnormal signal is a predetermined value or more, and determines that abnormality has occurred in an electronic control unit (ECU) connected to the communication network, if the regularity is lower than the predetermined value, based on a sequence of detection timings of the multiple signals each judged as the normal signal or the abnormal signal.

3. An abnormality determination apparatus in a communication network expected to be cyclically input with signals, comprising:
   a judgement unit which judges, based on detection timings of multiple signals in the communication network, whether each of the multiple signals is either a normal signal or an abnormal signal; and
   a determination unit which determines, if there is detected a signal judged as the abnormal signal, a type of abnormality having occurred in the communication network based on distribution of detection timings of multiple signals detected at a timing at which the signal judged as the abnormal signal is detected in the communication network or later, wherein each of the multiple signals is judged as the normal signal or the abnormal signal, wherein
   the determination unit determines that an impersonation attack has been performed on the communication network, if it is determined that the multiple signals each judged as the abnormal signal are detected within a predetermined time range from the multiple signals each judged as the normal signal, based on a sequence of the detection timings.

4. The abnormality determination apparatus according to claim 3, wherein
   the determination unit determines that an impersonation attack has been performed on the communication network, if it is determined based on the sequence of the detection timings that the multiple signals each judged as the abnormal signal are detected within a predetermined time range prior to detection timings of the multiple signals each judged as the normal signal.

5. The abnormality determination apparatus according to claim 3, wherein
   the determination unit determines that an impersonation attack has been performed on the communication network, if it is determined based on the sequence of the detection timings that the multiple signals each judged as the abnormal signal are detected within a predetermined time range later than detection timings of the multiple signals each judged as the normal signal.

6. The abnormality determination apparatus according to claim 3, wherein
the determination unit determines that an impersonation attack has been performed on the communication network, if it is determined that the multiple signals each judged as the abnormal signal are detected within a predetermined time range before and after detection timings of the multiple signals each judged as the normal signal, based on the sequence of the detection timings.

7. An abnormality determination apparatus in a communication network expected to be cyclically input with signals, comprising:
a judgement unit which judges, based on detection timings of multiple signals in the communication network, whether each of the multiple signals is either a normal signal or an abnormal signal; and
a determination unit which determines, if there is detected a signal judged as the abnormal signal, a type of abnormality having occurred in the communication network based on distribution of detection timings of multiple signals detected at a timing at which the signal judged as the abnormal signal is detected in the communication network or later, wherein each of the multiple signals is judged as the normal signal or the abnormal signal, wherein
the determination unit determines that a DOS attack has been performed on the communication network, if a number of at least one signal that is of the multiple signals judged as the abnormal signal, and has been detected between detection timings of successive signals each judged as the normal signal exceeds a predetermined number.

8. An abnormality determination apparatus in a communication network expected to be cyclically input with signals, comprising:
a judgement unit which judges, based on detection timings of multiple signals in the communication network, whether each of the multiple signals is either a normal signal or an abnormal signal;
a determination unit which determines, if there is detected a signal judged as the abnormal signal, a type of abnormality having occurred in the communication network based on distribution of detection timings of multiple signals detected at a timing at which the signal judged as the abnormal signal is detected in the communication network or later, wherein each of the multiple signals is judged as the normal signal or the abnormal signal;
an identification unit which identifies a reference signal that serves as reference for identifying an abnormal signal from multiple signals detected in the communication network; and
a timing estimation unit which estimates, based on a detection timing of the reference signal and time intervals over which the multiple signals are input to the communication network, timings at which multiple signals will be detected in the communication network later than the reference signal, wherein
the judgement unit judges whether each of the multiple signals detected in the communication network later than the reference signal is a normal signal, based on the timings estimated by the timing estimation unit, and detection timings of the multiple signals detected in the communication network later than the reference signal.

9. The abnormality determination apparatus according to claim 1, wherein the communication network is a communication network compliant with a controller area network (CAN) standard.

10. The abnormality determination apparatus according to claim 1, wherein
the determination unit determines that an attack has been performed on the communication network, if there is regularity in detection timings of the multiple signals each judged as the abnormal signal, based on the sequence of detection timings of the multiple signals each judged as the normal signal or the abnormal signal.

11. The abnormality determination apparatus according to claim 1, wherein
the determination unit determines that an impersonation attack has been performed on the communication network, if it is determined that the multiple signals each judged as the abnormal signal are detected within a predetermined time range from the multiple signals each judged as the normal signal, based on the sequence of detection timings.

12. The abnormality determination apparatus according to claim 11, wherein
the determination unit determines that an impersonation attack has been performed on the communication network, if it is determined based on the sequence of detection timings that the multiple signals each judged as the abnormal signal are detected within a predetermined time range prior to detection timings of the multiple signals each judged as the normal signal.

13. The abnormality determination apparatus according to claim 11, wherein
the determination unit determines that an impersonation attack has been performed on the communication network, if it is determined based on the sequence of detection timings that the multiple signals each judged as the abnormal signal are detected within a predetermined time range later than detection timings of the multiple signals each judged as the normal signal.

14. The abnormality determination apparatus according to claim 11, wherein
the determination unit determines that an impersonation attack has been performed on the communication network, if it is determined that the multiple signals each judged as the abnormal signal are detected within a predetermined time range before and after detection timings of the multiple signals each judged as the normal signal, based on the sequence of detection timings.

15. A mobile object, comprising:
the abnormality determination apparatus of claim 1.

16. The mobile object according to claim 15, wherein
the mobile object is a vehicle.

17. An abnormality determination method, comprising:
judging, based on detection timings of multiple signals in a communication network, whether each of the multiple signals is either a normal signal or an abnormal signal; and
determining, if there is detected a signal judged as the abnormal signal, a type of abnormality having occurred in the communication network based on distribution of detection timings of multiple signals detected at a timing at which the signal judged as the abnormal signal is detected in the communication network or later, wherein each of the multiple signals is judged as the normal signal or the abnormal signal, wherein the determining includes determining a type of attack performed by inputting an unauthorized signal to the communication network, based on a sequence of detection timings of the multiple signals each judged as the normal signal or the abnormal signal.

18. A non-transitory computer-readable storage medium having stored thereon a program for causing a computer to function as an abnormality determination apparatus in a communication network expected to be cyclically input with signals, wherein the program causes the computer to function as:
- a judgement unit which judges, based on detection timings of multiple signals in the communication network, whether each of the multiple signals is either a normal signal or an abnormal signal; and
- a determination unit which determines, if there is detected a signal judged as the abnormal signal, a type of abnormality having occurred in the communication network based on distribution of detection timings of multiple signals detected at a timing at which the signal judged as the abnormal signal is detected in the communication network or later, wherein each of the multiple signals is judged as the normal signal or the abnormal signal, wherein
- the determination unit determines a type of attack performed by inputting an unauthorized signal to the communication network, based on a sequence of detection timings of the multiple signals each judged as the normal signal or the abnormal signal.

\* \* \* \* \*